United States Patent [19]
Claflin et al.

[11] 3,751,067
[45] Aug. 7, 1973

[54] TRAILER LANDING GEAR FOOT
[75] Inventors: Hyle K. Claflin, North Muskegon; Jack T. Belke, Grand Rapids, both of Mich.
[73] Assignee: Westran Corporation, Muskegon, Mich.
[22] Filed: Sept. 13, 1971
[21] Appl. No.: 179,850

[52] U.S. Cl............................ 280/150.5, 254/86 H
[51] Int. Cl. ............................................. B60s 9/00
[58] Field of Search......................... 280/150.5, 475; 254/86 H, 86 R; 248/346, 357; 287/20 P

[56] References Cited
UNITED STATES PATENTS
2,840,391  6/1958  Stiel................................ 280/150.5
3,184,195  5/1965  Wahl................................. 248/158
5,658,359  4/1972  Claflin et al. .................... 280/150.5

Primary Examiner—Leo Friaglia
Assistant Examiner—David M. Mitchell
Attorney—Robert C. Hauke, Ernest I. Gifford et al.

[57] ABSTRACT

A readily detachable foot construction which includes a base plate and a pair of upstanding side plates fixed to the base plate for retaining the lower end of a landing gear leg therebetween. In one embodiment of the invention the two side plates include aligned apertures with one of the side plates laterally bendable prior to assembly to permit ready insertion of the leg into the foot. In another embodiment the bendable side plate is replaced by a hub plate which can be attached to the side plate by bolts or the like to mount the leg to the foot. Also included in each embodiment is a cross plate having at its upper edge a cut-out portion engageable with a mating extension at the lower leg end to take the side loads which would normally be imposed upon the side plates.

9 Claims, 9 Drawing Figures

PATENTED AUG 7 1973
3,751,067
SHEET 1 OF 2
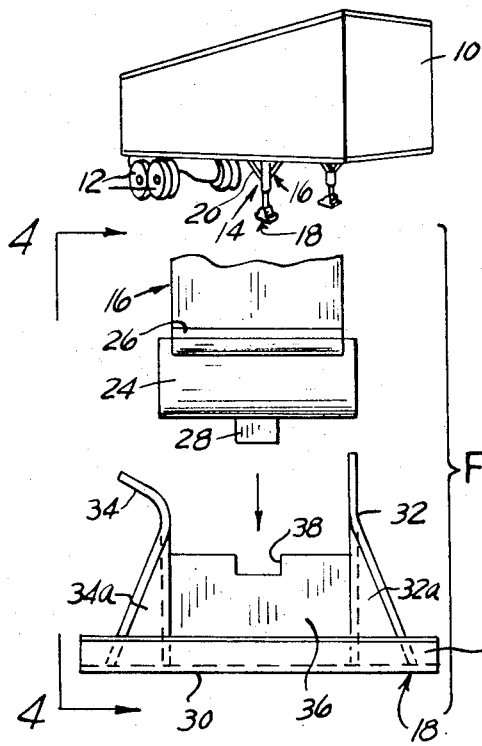
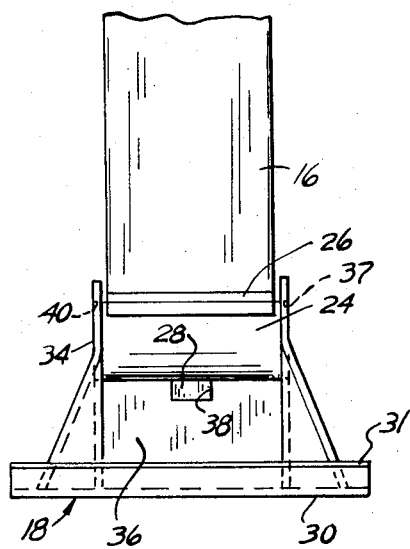
INVENTORS
HYLE K. CLAFLIN
JACK T. BELKE
BY Hauke, Gifford & Patalidis
ATTORNEYS

TRAILER LANDING GEAR FOOT

BACKGROUND OF THE INVENTION

This invention relates particularly to a landing gear for trailers in which the landing gear includes one or more legs pivotally mounted on the trailer frame for swinging between a vertical load supporting position and an upward retracted position. The legs are usually extensible for engagement with the ground when in their vertical position. They likewise may be telescoped to facilitate their upward swinging movement toward the retracted position. The leg and associated foot parts are subjected to stresses and loads during their raising and lowering. There is also considerable abrasive wear with regard to the foot itself which is generally in direct contact with concrete or with uneven and rough ground surfaces. It has previously been found necessary becausd of the loads exerted on the foot to make the foot of a heavy type construction and to further provide heavy duty linking and locking structures for attaching the foot to the leg end. Because of the costly and complex construction of the arts used, it was frequently necessary with prior art devices to remove the entire landing gear leg and its associated parts from the trailer in order to make possible the replacement of a worn foot. This involved unnecessarily large expenditure of time and of money.

SUMMARY OF THE INVENTION

It is an object of the present invention to provide an improved landing gear foot which has sufficient weight bearing capability to prevent failure even under extreme load and stress conditions. It is a further important object of this invention to provide an improved landing gear foot which is simple and durable in its construction and includes the additional advantage of being economical to manufacture, to install, and to remove for replacement. These objects and advantages are all derived from the particular construction of the foot with the cooperative relationship between bracing side plates, locking apertures formed in those plates and the transfer of load and stresses from the side plates to a cross plate provided by the particular cut-out configuration of the cross plate and the cooperating portion extending from the leg into the cut-out portion of the cross plate.

BRIEF DESCRIPTION OF THE DRAWINGS

For a better understanding of the invention and the several advantages thereof, reference is now made to the accompanying drawings wherein several preferred forms of the invention are disclosed. These drawings, in conjunction with the following description wherein like numerals are used to identify like parts, illustrate the invention, outline its principles and assist in explaining its mode of operation. In the drawings:

FIG. 1 is a perspective view of a trailer vehicle with a landing gear incorporating the present invention;

FIG. 2 is a front elevational view of the landing gear leg and foot of one preferred embodiment of the present invention in their position just prior to assembly, with parts broken away;

FIG. 3 is a view substantially similar to FIG. 2 in which the parts are shown in their final assembled position;

FIG. 4 is a side elevational view taken along the section lines 4—4 of FIG. 2 to further illustrate the relative position of the parts just prior to their assembly;

FIG. 5 is a top plan view along the lines 5—5 of FIG. 4 showing the foot itself and revealing its mode of construction;

DETAILED DESCRIPTION OF THE INVENTION

Figure 6:
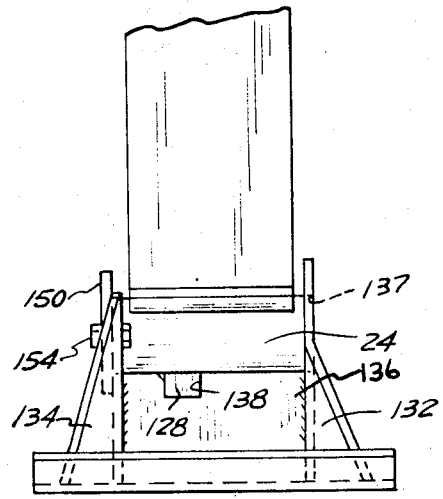
FIG. 6 is a view similar to FIG. 3 but illustrating another preferred embodiment of the present invention.

With reference to FIG. 1, a trailer is indicated generally by the numeral 10. The usual construction of such trailer includes two or more wheels or pairs of wheels 12 at one end of the trailer, with one or more ground engaging landing gear 14 attached at the other end of the trailer. Each landing gear 14 includes at its upper end an extensible leg 16 and at its lower end a foot 18, which foot is shown in its lowered position in supporting engagement with the ground. Also shown in part are the support struts 20 which are attached to brace and support the legs 16 and, in some cases, to provide their swinging movement out of engagement with the ground when the trailer is being transported or towed.

In the drawing of FIG. 2, the parts are shown just prior to assembly with the leg 16 held above the foot 18. The leg 16 includes a lower cylindrical portion 22, having attached to its lower end a projection in the form of a pivot sleeve 24. The circular cross section pivot sleeve 24 is attached to the lower end of the cylinder 22 through a bent plaje 26, preferably by welding means. Also affixed to the lower surface of the pivot sleeve 24 is a downwardly projecting block 28, for a purpose which will be explained hereinafter.

The foot 18 is shown in its aligned, preassembled position with respect to the leg 16. Included in the foot 18 are a base plate 30 and a pair of side plates 32 and 34, each of which has its lower edge joined to the base plate 30, again preferably by welding, as will be better shown in construction with FIG. 5. To increase the strength and rigidity of the side plates 32, 34, they are shaped with a pair of forward bends 32a and 34a, respectively. These forward bends are shown in FIG. 2, while there is further included a apir of rearward bends identified by the numerals 32b and 34b as best shown in FIG. 5 hereinafter. The base plate 30 further includes around its opposite edges a pair of generally upstanding lip portions 31 and 33. Mounted in an upstanding position between two side plates 32, 34 is a cross plate 36, which like the side plates 32, 34 is fixed by welding to the upper side of the base plate 30. The cross plate 36 includes at its upper edge a notched or cut-out portion 38 of a generally rectangular shape. It will also be seen that the downwardly projecting block 28 is shaped to mate with the cut-out portion 38 in the cross plate 36.

In the drawing of FIG. 3, the parts are shown with the leg 16 lowered into contact with the foot 18 to provide the final assembled rlationship. The side plates 32, 34 each contain a circular aperture 38, 40, respectively, which apertures are engageable about the periphery of the leftwardly and rightwardly extending ends of the pivot sleeve 24. It will further be realized that the side frame 34 was bent outwardly in the preassembled position to provide for the ready insertion of the sleeve 24 ends within the opposing apertures formed in the side plates 32, 34. The apertures 38 and 40 are best shown in FIG. 4 hereinaftr. In FIG. 3, after the parts have been placed in their assembled positions, the previously bent upper end of the side plate 34 is then pressed or hammered into its vertical position to retain securely in a locked position the lower end of the leg 16. The side plate 34 is preferably formed of a metal or a material which is strong, yet deformable, into and away from the locking position indicated in the FIG. 3 drawing. The block 28 is shown inserted in the cut-out portion 38 of the vertically standing cross plate 36. This cut-out feature is of particular importance with regard to the strength of the foot.

Prior art constructions for devices of this type frequently included heavy cylindrical side walls completely enclosing the lower end of the trailer feet to provide sufficient strength to resist the stresses of changing loads and positions. It has been found possible by using the cross plate 36 with its cut-out portion 38 and the mating projection 28 to provide sufficient stress transfer to the cross plate 36 to make it possible to decrease the thickness of the foot side members and to reduce the requirements for rigidity and strength in those members. Further, this construction permits an assembly in which the side plate 34 can be hammered into and out of place as shown. Ordinarily, side stresses imposed upon the side plates 34 during use of the landing gear would prevent this method of assmebly. In the present construction, this is made possible by the projection 28 and the cut-out 38, which transfer side loads or shearing forces which would ordinarily be imposed upon the side plates 32, 34 to the cross plate 36. This approach has made it possible to greatly simplify and cut the cost of the foot. It will be additionally seen that all of the foot parts used may be fabricated of relatively inexpensive stampings and weldments.

FIG. 4, in a like manner to FIG. 2, shows the assembly before the parts are locked together. The opposing apertures 38 and 40, formed in the two side plates, are indicated just prior to the straightening of the upper end of the side plate 34. Also shown are the relative size and thickness of the cross plate 36 and its relative positioning with respect to the side plates 32 and 34.

FIG. 5 clarifies the manner in which the side plates 32 and 34 are fastened together and in their vertical position on the base plate 30. Also shown is the manner in which the forward and rearward bend portions 32a and 32b of the side plate 32 are welded to the upper surface of the base plate 30. In a like manner, the forward and rearward bent portions 34a, 34b of the side plate 34 are welded to the upper surface of the base plate 30. Again, the upper portion of the side plate 34 is shown as it is bent laterally before assembly of the parts.

Figure 7:
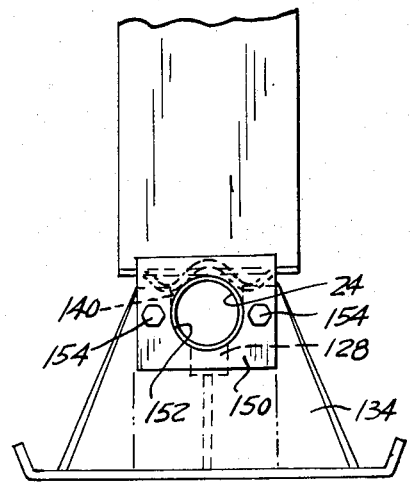
FIG. 7 is a side elevational view as seen from the left side of FIG. 6.
Figure 8:
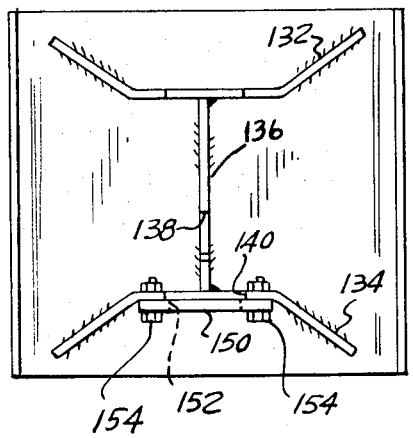
FIG. 8 is a top elevational view of the foot shown in FIGS. 6 and 7.
Figure 9:
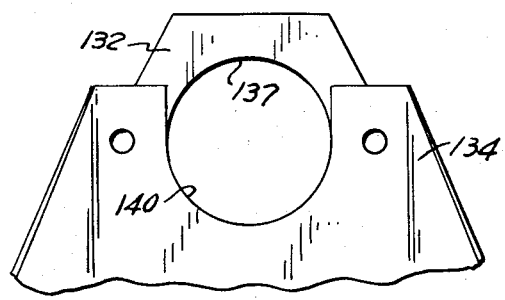
FIG. 9 is a fragmentary, enlarged view of structure shown in FIG. 7 with portions removed for purposes of clarity.

FIGS. 6, 7, 8 and 9 illustrate another preferred embodiment of the present invention similar in many respects to the embodiment shown in FIGS. 2-5 but in which the side plate 34 has been replaced by a modified side plate 134. As can best be seen in FIG. 9 the side plate 134 is provided with an opening 140 which is curved along its lower portion but which extends up to the upper edge of the side plate 134. The pivot sleeve 24 is adapted to extend into the aperture 137 provided in the side plate 132 and to rest upon the lower portion of the opening 140. A hub plate 150 (FIGS. 6, 7 and 8) containing a circular aperture 152 for receiving the end of the pivot sleeve is then fastened by bolts 154 to the side plate 134 to thereby lock the foot 118 to the leg 116.

Like the embodiment of FIGS. 2-5 the foot 118 includes a cross plate 136 with a cut-out portion 138 for receiving a downwardly projecting block 128 formed on the pivot sleeve 24 to receive the side loads ordinarily imposed upon the side plates 132-134 and the hub plate 150.

It will thus be seen that the present invention provides a greatly improved construction for a foot for a trailer landing gear with regard to its low cost of fabrication, ease of assembly and disassembly, and its improved strength. This advancement, particularly as it relates to trailer vehicles and the like, is a substantial one.

What is claimed is:

1. An assembly for mounting a foot on the end of a trailer landing gear leg, said assembly comprising
    a base plate;
    a pair of side plates mounted in opposed spaced relationship on said base plate;
    a pivot member carried by the lower end of said landing gear leg;
    means formed by said side plates for receiving and retaining said pivot member;
    a cross plate mounted on said base plate and extending between said side plates; and
    means formed on said pivot member and on said cross plate and coacting to transfer side loads ordinarily imposed on said side plates to said cross plate.

2. The assembly as defined in claim 1 and in which said last mentioned means comprises a projection formed on said pivot member and a recess formed in said cross plate for receiving said projection.

3. The assembly as defined in claim 1 and in which said receiving and retaining means comprises aligned apertures formed in said side plates for receiving said pivot member, the apertures of one of said side plates being open to the top of said side plate and a hub plate fastened to said side plate for closing said open aperture to lock said pivot member to said foot.

4. The assembly as defined in claim 1 and in which said receiving and retaining means comprises aligned apertures formed in said side plates for receiving said pivot member, one of said plates being bendable laterally from a position in which said aperture in said bendable side plate is spaced from said pivot member to a position in which said pivot member extends into the aperture of said bendable side plate.

5. An assembly for mounting a foot on th end of a trailer landing gear leg, said assembly comprising
    a base plate;
    a pair of side plates mounted in opposed, spaced relationship on said base plate;
    each of said side plates including a like, opposed aperture;
    one of said side plates bendable from an open position to a closed position to enfold its aperture over the corresponding lower end of said leg; and
    a cross plate mounted on said base plate and extending between said side plates, said cross plate including at its upper edge a central cut-out portion, said leg including fixed to its lower end a transversely extending pivot means, said pivot means having each respective end rotatably journalled in one of said apertures in said closed portion and including a downwardly extending projection mounted on its lower surface and engageable in said cut-out portion of said cross plate.

6. A foot for attachment to the lower end of a trailer leg, said leg having a pivot member mounted at its lower end, said foot comprising a base plate;

a pair of opposed side plates mounted in upstanding, spaced positions on said base plate;

a cross plate having a central, cut-out portion formed in its upper edge, said cross plate fixed transversely on said base plate between said side plates;

one of said side plates having an upper end bendable between an open position and a closed position and operable in its closed position to receive and retain said pivot member in secure holding engagement between said side plates, said pivot member including a block fixed to its lower surface and extending in juxtaposed relationship with said cross plate and engageable in said cut-out portion thereof.

7. The combination as set forth in claim 6 wherein each of said side plates includes a like, opposed aperture for holding a respective end of said pivot member in locking relationship.

8. The combination as set forth in claim 6 wherein said pivot member comprises a pivot sleeve of substantially circular cross section and having each of its ends rotatably engageable in a respective one of said apertures.

9. A foot for a trailer landing gear having a pivot member fixed to its lower end, said foot comprising a base plate;

a pair of opposed, spaced side plates fixed at their lower edges to said base plate;

a cross plate fixed to said base plate and extending crosswise between said side plates, said cross plate further having a central cut-out portion in its upper edge;

at least one of said side plates being bendable between an open position and a closed holding position about said pivot member; and means extending from said lateral projection and into said central cut-out portion.

* * * * *